No. 895,118.
B. R. SKINNER.
STATION INDICATOR.
APPLICATION FILED DEC. 31, 1906.
PATENTED AUG. 4, 1908.
3 SHEETS—SHEET 1.
Fig. 1.
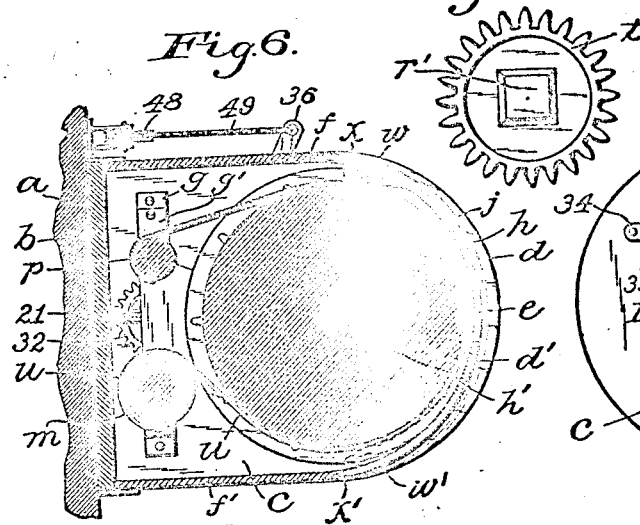
Fig. 2.
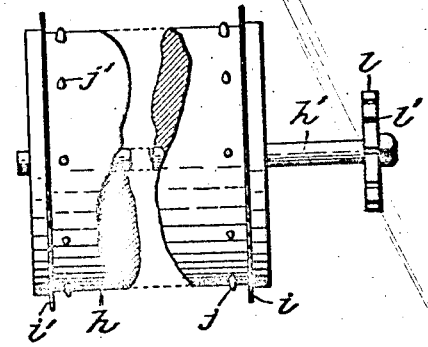
Fig. 3.
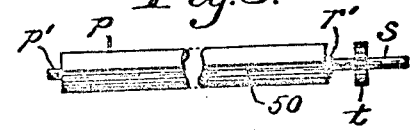
Fig. 4.
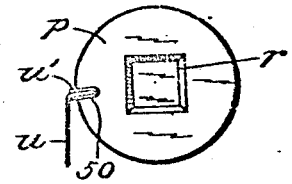
Fig. 5.
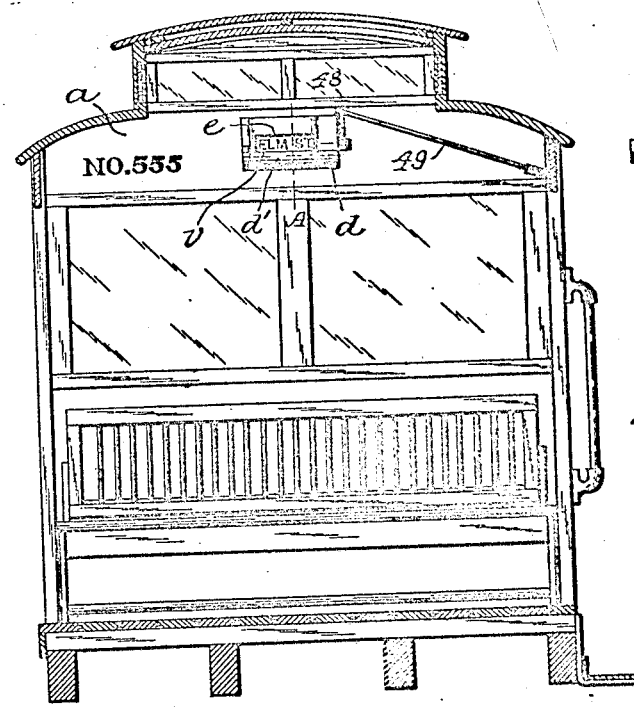
Fig. 6.
Fig. 7.
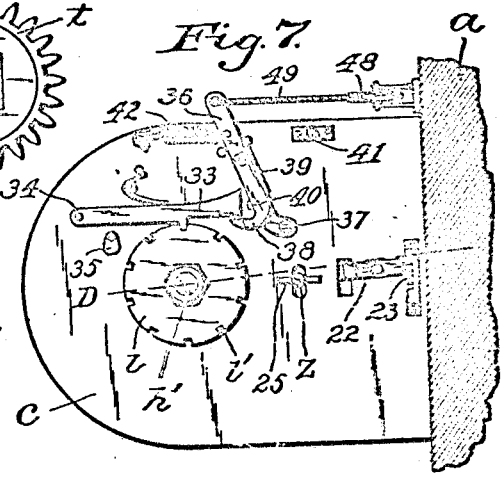
WITNESSES:
J. H. Gardner.
M. D. Beaty.
INVENTOR:
B. R. Skinner,
BY E. T. Silvius
ATTORNEY.

No. 895,118. PATENTED AUG. 4, 1908.
B. R. SKINNER.
STATION INDICATOR.
APPLICATION FILED DEC. 31, 1906.
3 SHEETS—SHEET 2.
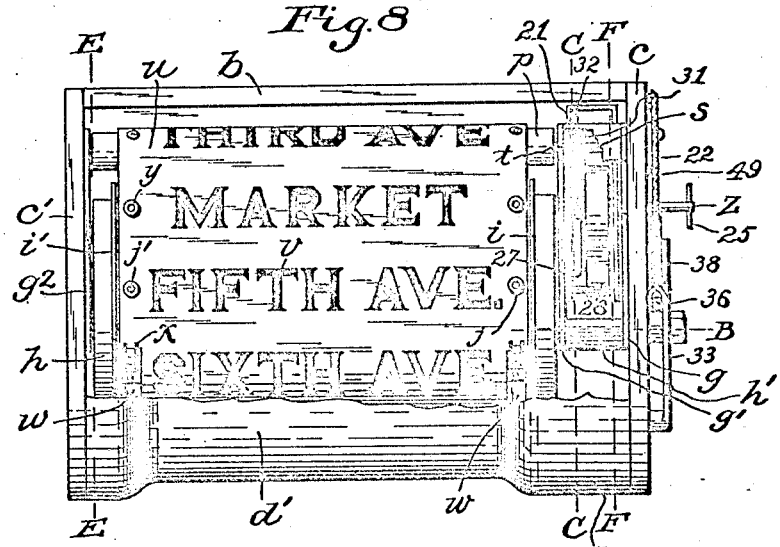
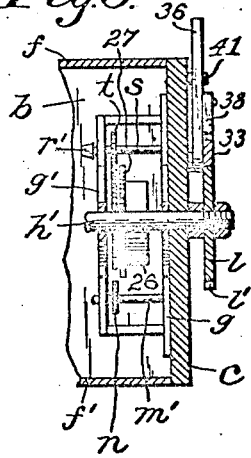
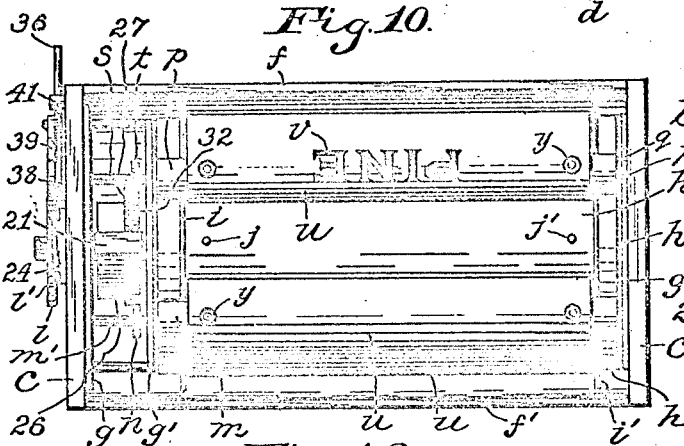
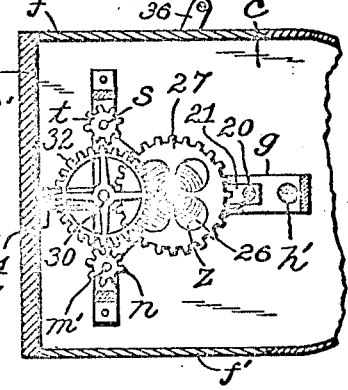
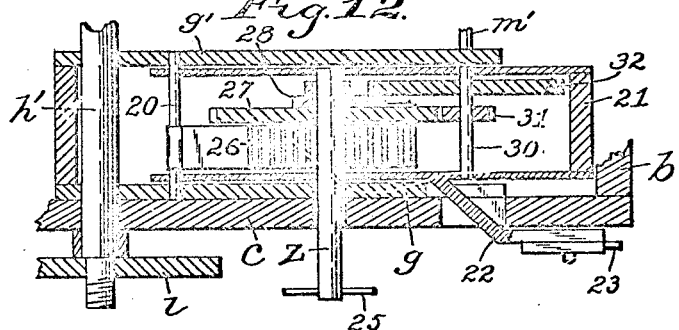
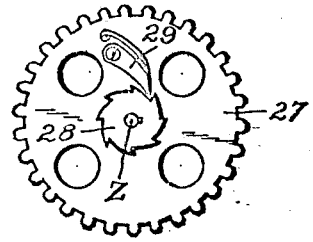
WITNESSES:
J. H. Gardner.
M. D. Beaty.
INVENTOR:
B. R. Skinner,
BY E. T. Silvius,
ATTORNEY.

No. 895,118. PATENTED AUG. 4, 1908.
B. R. SKINNER.
STATION INDICATOR.
APPLICATION FILED DEC. 31, 1906.
3 SHEETS—SHEET 3.
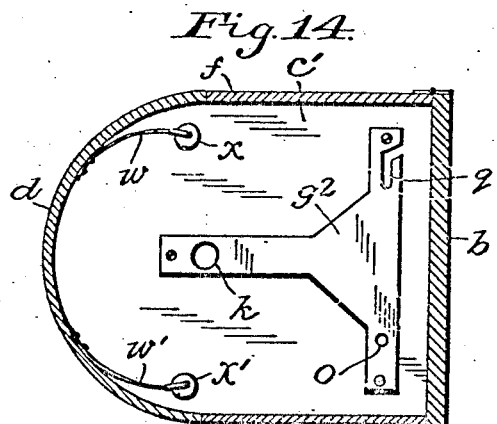
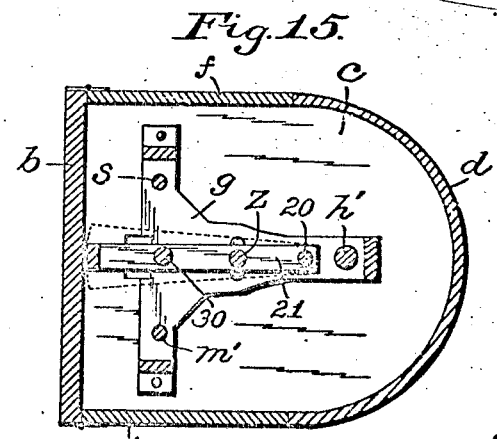
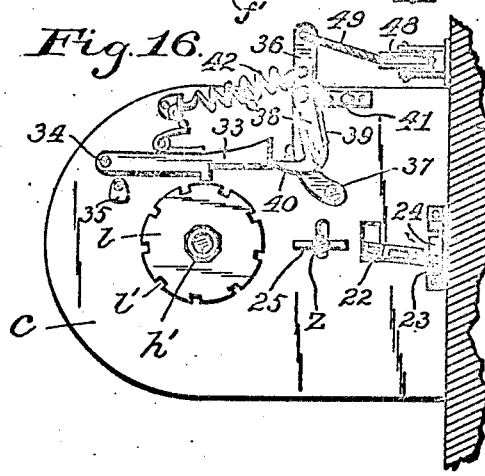
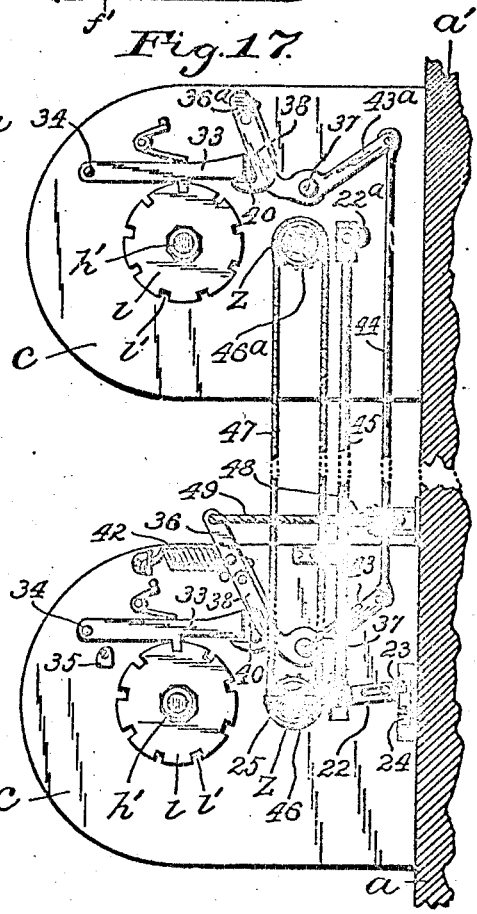
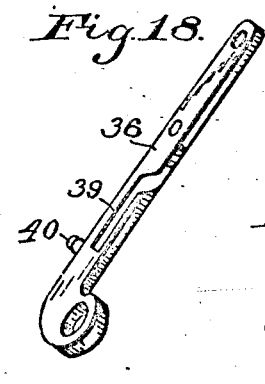
WITNESSES:
J. H. Gardner.
M. D. Beaty.
INVENTOR:
B. R. Skinner,
BY E. T. Silvius,
ATTORNEY.

UNITED STATES PATENT OFFICE.

BURR R. SKINNER, OF AUSTIN, MINNESOTA.

STATION-INDICATOR.

No. 895,118.　　　Specification of Letters Patent.　　　Patented Aug. 4, 1908.

Application filed December 31, 1906. Serial No. 350,250.

*To all whom it may concern:*

Be it known that I, BURR R. SKINNER, a citizen of the United States, residing at Austin, in the county of Mower and State of Minnesota, have invented certain new and useful Improvements in Station-Indicators; and I do declare the following to be a full, clear, and exact description of the invention, reference being had to the accompanying drawings, and to the letters and figures of reference marked thereon, which form a part of this specification.

This invention relates to apparatus for use in public conveyances such as street cars, interurban cars, steam cars and stage-coaches, for announcing to passengers or indicating the names of the stations on the line of travel in succession when approaching the stations or streets where stops may be made, the invention having reference particularly to the mechanism whereby the desired results are obtained.

The objects of the invention are to provide an indicator or annunciator of the above-mentioned character which shall be adapted to be constructed so as to operate with precision under all conditions of use and at reasonable expense for construction, and which will be durable and economical in use and not liable to derangement; a further object being to provide a station indicator adapted to be readily changed when shifting cars from one route to another and when about to return upon any route.

With the above-mentioned and minor objects in view the invention comprises a station indicator having a novel form of ribbon for displaying the names of the stations, a novel arrangement of rollers for supporting and shifting the ribbon, and novel mechanism for actuating and controlling the movements of the rollers periodically. And the invention consists further in the elements and the combinations and arrangements thereof as hereinafter particularly described and pointed out in the appended claims.

Referring to the drawings Figure 1 is a transverse sectional view of the body part of a car showing the improved indicator in front elevation arranged therein; Fig. 2, a fragmentary front view of the controlling drum or roller for the name-ribbon; Fig. 3, a fragmentary front view of one of the winding rollers; Fig. 4, an end view of the winding roller with part of its supporting shaft omitted and a fragment of the ribbon connected thereto; Fig. 5, an end view of the part of the supporting shaft that is omitted from Fig. 4; Fig. 6, a transverse sectional view of the indicator approximately on the line A in Fig. 1; Fig. 7, an end elevation of the indicator and a portion of the car body in section; Fig. 8, a top plan of the indicator with the top part of the casing thereof broken away and exposing the internal mechanism; Fig. 9, a fragmentary sectional view on the line B in Fig. 8; Fig. 10, a rear elevation of the indicator with the back of the casing omitted so as to expose the internal mechanism; Fig. 11, a fragmentary sectional view of the indicator on the line C C in Fig. 8; Fig. 12, a fragmentary sectional view approximately on the line D in Fig. 7; Fig. 13, a plan view showing parts of the motor for operating the name-ribbon; Fig. 14, a transverse sectional view approximately on the line E E in Fig. 8; Fig. 15, a transverse sectional view approximately on the line F F in Fig. 8; Fig. 16, an end elevation of the indicator showing the trip mechanism as when being operated; Fig. 17, an end elevation of a pair of indicators having modifications adapting them for use in a car having an upper deck or compartment, both indicators being connected together so as to operate simultaneously; Fig. 18, a perspective view of one of the operating levers for the trip mechanism; and Fig. 19, a perspective view of the movable detent for the trip lever.

Similar reference characters in the various figures of the drawings designate corresponding elements or features of construction.

In the drawings *a* designates the forward end of the car or conveyance against the interior of which, on the upper portion of the forward part, the indicator is mounted so as to face towards the rear end of the car; *b* designates the back, *c* and *c'* the ends, *d* the front having a sight-opening *e* therein, and *f* and *f'* top and bottom doors respectively of the casing hinged to the back *b*. A portion of the front *d* is preferably pressed inwardly as at *d'* so as to be close to the name-ribbon, and the sight-opening *e* is in this set-in portion, the exterior of the front being convex rather for the sake of symmetry but of course not necessarily so, as will become apparent.

The principal parts of the internal mechanism are mounted directly on the ends *c* and *c'* of the case of the indicator. A housing for the motor comprises two similar parts $g$ and $g'$, the part $g$ being secured to the inner side of the end $c$, and a bearing plate $g^2$ is secured to the inner side of the end $c'$. A relatively large controlling drum $h$ extends substantially from the housing to the bearing plate $g^2$, and has a supporting shaft $h'$ journaled in the housing and extending through the end $c$, and also journaled in the plate $g^2$, the drum being provided near its ends with guide flanges $i$ and $i'$, and also with a suitable number of pointed projections $j$ and $j'$ near the flanges. The plate $g^2$ has a journal bearing $k$ to receive the shaft of the drum and of course the housing also has similar bearings for the shaft. On the outer end of the shaft $h'$, a disk $l$ having spaced notches $l'$ is secured thereto for positively stopping and holding the drum periodically in order to hold the name-ribbon on the drum with a station name fair with the sight-opening $e$. The drum $h$, as will be seen, is arranged in the forward portion of the indicator case so that its forward part will be close as may be to the sight-opening $e$.

Rearward of the controlling drum $h$ a pair of winding drums are mounted for holding the end portions of the ribbon and winding the ribbon from either one to the other one of the rolls, a roller $m$ having a shaft $m'$, being mounted in the lower portion of the casing in the housing and the plate $g^2$, the shaft being provided with a long-toothed pinion $n$ in the housing, the plate $g^2$ having a journal bearing $o$ to receive the journal of the shaft, the housing obviously having also suitable bearings for the shaft. A roller $p$ is mounted in the upper portion of the case and has a journal $p'$ at one end thereof mounted in a slotted bearing $q$ in the plate $g^2$, so that the journal may be readily lifted from its bearing, the other end of the roller having a socket $r$ in its end to receive a squared end $r'$ of a short shaft $s$ that is suitably journaled in the housing and provided with a long-toothed pinion $t$ so that the roller $p$ may be readily removed from the case without removing its driving shaft $s$.

The name-ribbon $u$ may be of any suitable length and is of suitable width to extend from one to the other one of the guide flanges $i$ and $i'$ of the controlling drum, and the ends of the ribbon may be suitably connected in any preferred manner to the winding rollers $m$ and $p$, with the ribbon extending about the forward portion of the drum, the arrangement being such that the ribbon will lead over the tops of the winding rollers when being wound thereon.

The ribbon is preferably composed of canvas, and on one face thereof the street or station names $v$ are arranged in any suitable manner, preferably by painting or printing the names thereon. The casing supports spring arms $w$ and $w'$ in the ends of which are mounted grooved rollers $x$ and $x'$, arranged so as to roll against the ribbon and hold it close to the drum in the upper and lower portions of the case, the grooves of the rollers clearing the projections $j$ and $j'$. The ribbon is provided with eyelets $y$ to receive the projections $j$ and $j'$, the eyelets being spaced along the edge portions of the ribbon at suitable distances apart, corresponding to the spacing of the names on the ribbon.

A pivot 20 is supported by the parts $g$ and $g'$ of the housing, and a swinging motor frame 21 is mounted on the pivot, the frame having an arm 22 that extends through a suitable opening in the end $c$ of the case and provided with a latch 23 adapted to engage a notched latch-plate 24 that is secured to the outer side of the end $c$, so that the swinging frame may be held at either one of two positions. A main motor shaft $z$ is mounted rotatively in the swinging frame and extends through suitable openings in the part $g$ and end $c$, and is provided at the outer end thereof with a lever 25 for winding a helical spring 26 secured to the shaft and also to the pivot 20, there being a gear wheel 27 rotative on the shaft $z$, and a ratchet wheel 28 secured to the shaft, a pawl 29 being mounted on the wheel 27 in engagement with the ratchet wheel. A counter-shaft 30 is journaled in the swing frame 21 and has a pinion 31 secured thereto in engagement with the gear wheel 27, and a long toothed gear wheel 32 is also secured to the shaft 30 so as to be movable by the swinging frame into contact with either the pinion $n$ or the pinion $t$, so that the motor may rotate either the roller $m$ or the roller $p$. The long teeth (shown more particularly in Fig. 5) are provided in order that in shifting the frame 21 the wheel 32 may engage one of the pinions, before it separates from the opposite pinion in order to prevent the motor from racing during the reversing operations. It will be apparent that the motor may cause the name-ribbon to be wound upon either one of the winding rollers while being unwound from the opposite roller, the ribbon while in motion causing the drum $h$ to rotate.

A dog 33 is mounted on the exterior of the end $c$ of the case by means of a pivot 34, the dog being adapted to drop into the notches $l'$ of the disk $l$ to periodically hold the drum $h$ with a name opposite the sight-opening $e$, and at the same time stopping the motor mechanism by means of the name-ribbon. A movable stop 35 is pivoted adjacent to the dog 33 and may be turned into position so as to prevent the dog from dropping into the notches $l'$, the dog being spring pressed towards the disk $l$. A trip lever 36 is mounted on the end $c$ by means of a pivot 37 and has a detent 38 mounted thereon that is adapted to lift the dog 33 from contact with the disk $l$, the lever being provided with a spring 39, normally pressing the detent against a stop 40 with which the lever is provided. The end $c$ is provided with a stop 41 to be engaged by the lever 36 after the dog 33 has been drawn out of contact with the disk $l$, there being a spring 42 provided for drawing the lever away from the stop so that the detent 38 may again come into operative position under the dog 33.

When it is desired to place an indicator in the upper deck of a conveyance as at $a'$ the lever 36 is provided with an arm 43, and the upper indicator is provided with a lever $36^a$ somewhat similar to the lever 36 and provided with an arm $43^a$, the latter being connected with a rod or link 44 that is connected to the arm 43; also a rod 45 is connected to the arm 22 and also to an arm $22^a$ similar to the arm 22 with which the upper indicator is provided. A sprocket wheel 46 is secured to the shaft $z$ of the lower or main indicator and the sprocket wheel $46^a$ is secured to the shaft $z$ of the upper indicator, there being a sprocket chain 47 connecting the two sprocket wheels so that both motor springs may be wound simultaneously and also both indicators may be tripped for operation at the same time, and also be reversed at the same time. A guide pulley 48 is mounted on the front $a$, and a pull cord 49 is connected to the lever 36 and runs over the pulley to any suitable point, within convenient reach of the conductor or other person designated to attend to the operation of the indicator or indicators.

For convenience in inserting or removing the name-ribbon for use, it is designed that each ribbon may be ordinarily kept at headquarters on a roller $p$, so as to be kept in good condition and to be readily inserted into a register case, and in order to render the ribbon easily removable from the roller and also from the roller $m$, or for connection to the roller $m$, the rollers are each provided with a longitudinal groove 50, and the ends of the ribbon have metallic bindings $u'$ insertible into the grooves, whereby the ribbons may be quickly connected or disconnected from the rollers.

While I have shown a spring actuated motor as a matter of convenience, I do not wish to be limited to such a motor, being aware that in the operation of electric cars I may adapt the motor so as to be operated by other suitable means.

In practical use when starting a car on its route the name of the next street or station at which the car will arrive is to be displayed, and then after passing the next station the conductor or attendant should pull the cord 49 so as to move the lever 36 against the stop 41, such movement causing the detent 38 to lift the dog 33 to permit the motor to operate and cause the disk $l$ to begin its movement, the dog 33 being immediately dropped into contact with the disk so that it will drop into the next notch $l'$ as the disk rotates, thus stopping the name-ribbon for displaying the next station. The return movement of the lever 36 will not interfere with the movement of the dog since the detent 38 will yield and slide against the dog until the point of the detent arrives between the dog and the disk. At the end of the route the latch 23 may be disengaged from the latch-plate 24 and moved to its opposite position so as to reverse the motion of the name-ribbon, as will be understood; also the motor may be wound up ready for the return trip. In case it becomes necessary to shift the name-ribbon before beginning a trip, the dog 33 may be drawn out of contact with the disk $l$, and if desired may be held by the stop 35, and the motor may be permitted to roll the ribbon the necessary distance onto either the roller $m$ or the roller $p$ to properly position the name of the first station or street that is to be approached. Other operations of the apparatus will be fully understood from the foregoing description of the construction thereof.

Having thus described the invention, what is claimed as new is—

1. A plurality of station indicators, one arranged in a higher plane than the other, each indicator having a pair of winding rollers and a controlling drum, a name-ribbon for each indicator to be wound over the drum onto either one of the rollers, swinging motor frames connected together, one for each indicator, motors mounted in the frames for operating the rollers, stop devices for the ribbons, trip devices for actuating the stop devices and connected one to the other, there being a trip device for each stop device, connections between the drum and the ribbon of each indicator, and connections between the motors of the plurality of indicators.

2. In a station indicator, the combination of a case, a rotative shaft mounted in the case and extending through the wall thereof, a drum attached to the shaft, a name-ribbon on the drum, a roller to move the name-ribbon and the drum, a notched disk secured to the shaft at the outer side of the case, a dog pivoted on the exterior of the case and normally entering a notch of the disk, a trip lever pivoted on the case adjacent to the dog, a spring normally pressing the lever towards the dog, a detent mounted movably on the trip lever opposite to the dog to lift the dog from the disk, and a spring mounted on the trip lever in engagement with the detent and normally pressing the detent into operative engagement with the dog.

In testimony whereof, I affix my signature in presence of two witnesses.

BURR R. SKINNER.

Witnesses:
RAY CHAFFEE,
J. M. REYNOLDS.